United States Patent
Eves et al.

(10) Patent No.: US 6,643,697 B1
(45) Date of Patent: Nov. 4, 2003

(54) NETWORK COMMUNICATION SYSTEM PROVIDES USERS CAPABILITIES TO PERFORM INITIAL REGISTRATION SIMPLIED CONNECTION PROCEDURES AND ACCESS MULTIPLE HOST SYSTEMS WITHOUT REPEATION A FULL REGISTRATION

(75) Inventors: David A. Eves, Crawley (GB); Allan R. Timms, Peacehaven (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/354,605

(22) Filed: Jul. 16, 1999

(30) Foreign Application Priority Data

Jul. 16, 1998 (GB) ............................................. 9815364

(51) Int. Cl.[7] ............................................. G06F 15/173
(52) U.S. Cl. ...................................... 709/225; 709/246
(58) Field of Search ................................ 709/246, 203, 709/216, 217, 227, 228, 225; 707/513, 10, 104.1; 713/201

(56) References Cited

U.S. PATENT DOCUMENTS 5,727,159 A * 3/1998 Kikinis ........................ 709/246
6,167,441 A * 12/2000 Himmel ..................... 707/104.1
6,205,482 B1 * 3/2001 Navarre et al. ................ 707/10
6,247,048 B1 * 6/2001 Greer et al. .................. 709/203
6,289,358 B1 * 9/2001 Mattis et al. .................. 707/10
6,311,215 B1 * 10/2001 Bakshi et al. ................ 707/513
6,317,838 B1 * 11/2001 Baize .......................... 713/201

FOREIGN PATENT DOCUMENTS

EP         0732660 A1      9/1996      ........... G06F/17/30

OTHER PUBLICATIONS

Reducing WWW Latency and Bandwidth Requirements by Real–Time Distillation, Fox et al, Computer Networks and ISDN Systems, NL, North Holland Publishing vol. 28, No. 11, 1996.

* cited by examiner

*Primary Examiner*—Le Hien Luu
(74) *Attorney, Agent, or Firm*—Daniel J. Piotroski

(57) ABSTRACT

A network communications system comprises a plurality of configurations of user stations (16, 18, 20, 22, 24), each with respective processing and display capability. From a plurality of service provider host systems coupled via data network such as the Internet, one host server (10) has at least some of the system users and their respective user station or stations registered as client stations. Each registered client station of a single user is arranged to access network services via the host server (10), with the host server arranged to format data to be sent to any of the client stations of said single user according to a pre-stored format for that user.

9 Claims, 5 Drawing Sheets

NETWORK COMMUNICATION SYSTEM PROVIDES USERS CAPABILITIES TO PERFORM INITIAL REGISTRATION SIMPLIED CONNECTION PROCEDURES AND ACCESS MULTIPLE HOST SYSTEMS WITHOUT REPEATION A FULL REGISTRATION

BACKGROUND OF THE INVENTION

The present invention relates to user access systems and service provider host systems for data and service networks, particularly but not exclusively for use with the Internet/World Wide Web, and to means for initiating and managing communications of a user.

Recent years have seem a rapid increase in the amount of data available to a user via data network coupling to remote server, with cheap browser packages for home personal computer (PC) users and dedicated (and cheaper) access mechanisms such as WebTV greatly increasing the number of people on-line. A number of examples of network access and server systems, whether for the Internet or on a smaller local area network (LAN), are described in the introduction to EP-A-0 732 660 (Kambayashi et al/Toshiba) which relates to a mechanism for providing a degree of personalisation in service provision.

In the system described, a number of client systems (for example home users) are enabled to access, via network, data stored by a server. Each of these users is registered with the server having provided to it certain personal details such as an e-mail address and/or telephone number and optionally also a photograph. In operation, when a user is accessing a particular store or field of data held by the server, the server provides to the user a list of those other users concurrently accessing the data, perhaps providing an on-screen display of the photographs of those registered users.

As the number of devices having means to access servers, applications, other users and so forth using networks such as the Internet continues to grow, as well as the number of assets and service provider types, the greater the number of interface configurations a user is likely to be faced with during the course of the working day, and the greater the number of protocols and procedures for registration of a device as a system client the user will be required to navigate. This obviously can lead to confusion and inefficiency for the user who would then be likely to remember how to access only a small part of the functionalities available to him.

SUMMARY OF THE INVENTION

It is therefore an object of the present invention to provide a means whereby a user is provided with greater uniformity in his dealings with remote devices, whilst not being required to learn a great deal more control instructions.

In accordance with a first aspect of the present invention there is provided a network communications system comprising a plurality of configurations of user stations, each comprising respective processing and display means, and a plurality of service provider host systems coupled via a data network, wherein at least some of the user stations are registered as client stations with a first service provider host system, said first host system including storage means maintaining a database of registered client station user. identification data; characterised in that each client station of a single user is arranged to access said plurality of service provider host systems via said first host system, and said first host system is arranged to format data to be sent to any client station of said single user according to a pre-stored format for that user.

In this network communications system, on registration of a new user, the host system is suitably arranged to generate a digital password, transmit the said password to the client station currently used by the user via the data network, and store the said password with details of the new user within the said database. In such a case, on registration of a new client station for an existing registered user, the first host system is preferably configured to link the user details to the new client details on receiving the password from the user via the new client station, thereby avoiding the user having to repeat a full registration procedure for each device they own.

Each client station may be arranged to identify one or more of its functional capabilities to the first host system, with host system being arranged to modify the formatting of data sent to said client where said functional capabilities preclude use of said pre-stored format. These functional capabilities may include supported image resolution for a display device of the user station, with the first host system then being arranged to set the resolution of display data sent to said user station accordingly. In this way, a reduction in data traffic is achieved by not sending high resolution colour images to, for example, a basic pager.

The first host system storage means may hold a plurality of data assets for a given user, which assets are made available to each client station of that user. The first host system storage means may then be operable, on receipt of a predetermined command from the given user, to make available one or more of these data assets (for example an address book utility) to a further user identified by the given user.

Further in accordance with the present invention there is provided a data network browser configured as a user station for use in the network communications system described above, the browser comprising a data processor coupled with a network interface and an output for driving a display, the browser further comprising an actuator coupled with a store holding the network address of said first host system and being configured, on user operation of said actuator, to establish connection to said first host system via said network.

Still further in accordance with the present invention there is provided a network server for use as said first service provider host system in a network communications system as recited above, the server comprising a first storage means maintaining a database of registered user and user client station identification data, and means to identify messages from a particular user, to recall from store a specified message format for that user, and to convert, prior to transmission, all messages to that user to the specified format.

Further features and advantages of the present invention will become apparent from reading of the following description of preferred embodiments of the present invention, given by way of example only and with reference to the accompanying drawings in which:

DETAILED DESCRIPTION OF THE PREFERRED EMBODIMENTS

Figure 1:
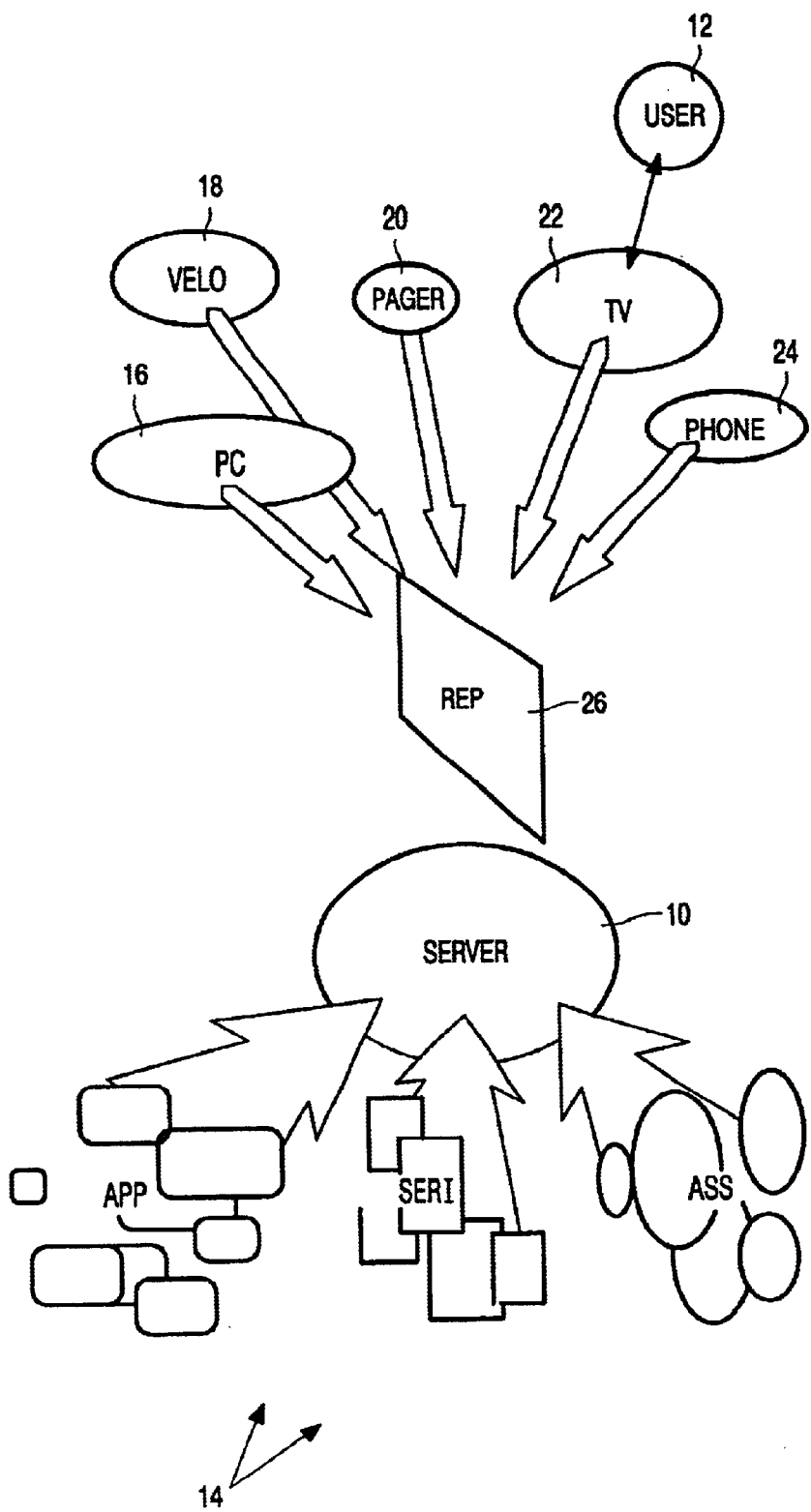
FIG. 1 is a general schematic diagram of user devices enabled to access a plurality of remote services and applications via a server.

Beginning with FIG. 1, in the generalised system shown, a server 10 acts as arbiter between one or more users 12 and content from a variety of sources, indicated generally at 14. As shown, the user access may be by means of any one of a number of devices (clients) in his/her possession, such as a personal computer (PC) 16, electronic personal organiser (VELO) 18, pager 20, television 22 (the selected means in the illustrated example), or telephone 24. To handle, for the user, the large number of potential interface arrangements between types of user access device and accessed applications APP, assets ASS or services SERI, the server 10 stores a representation REP (shown generally at 26) of both the user and the clients that they use. This will be referred to herein as the "user" data type.

Figure 2:
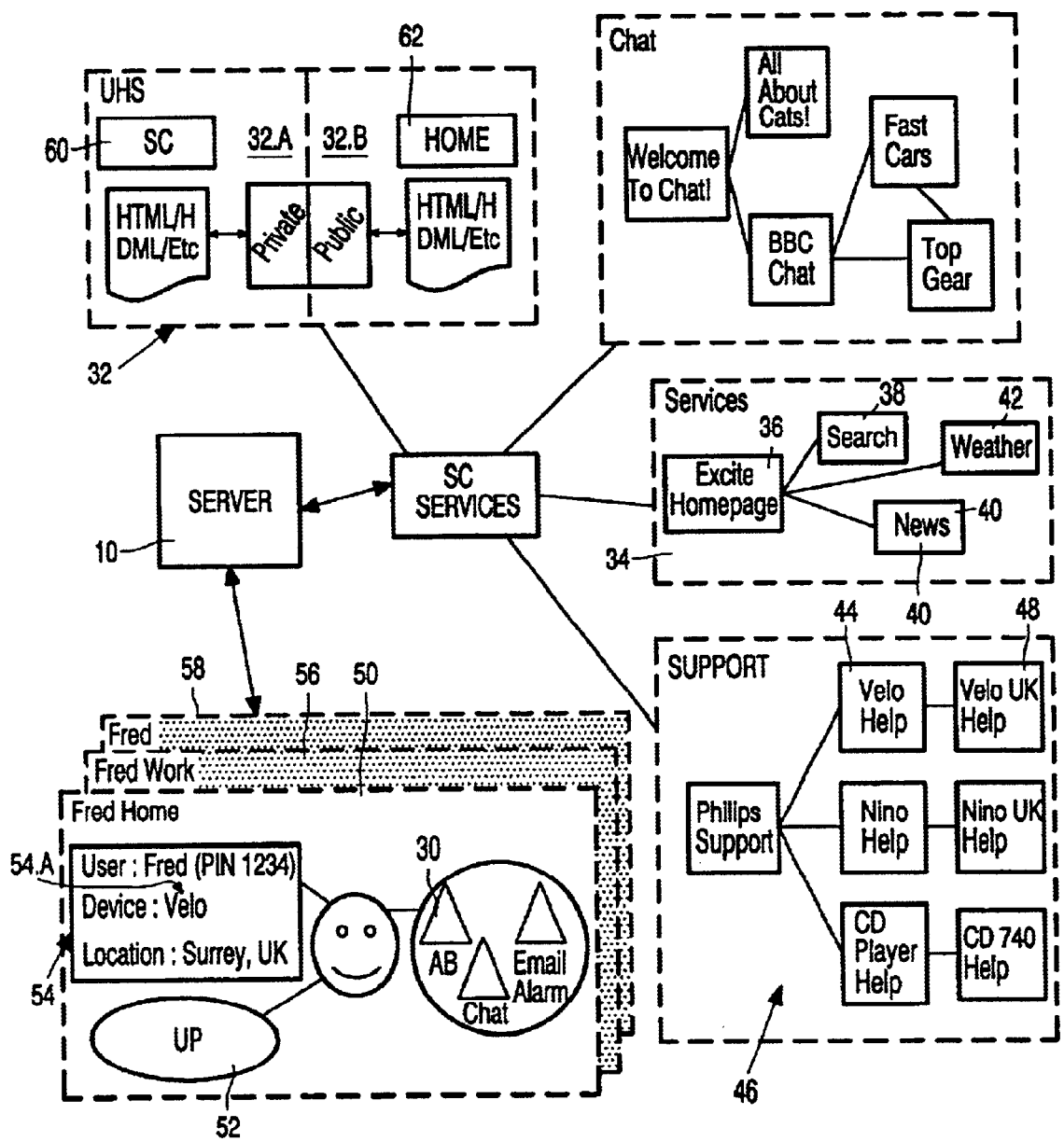
FIG. 2 is a further schematic diagram showing in greater detail aspects of data arrangement in the server of FIG. 1.

Services are made available and the content that they use arranged for optimum suitability to the users preferences (as stored by the server) and different client capabilities. This information is structured in the server 10 through a combination of user-traversable "Rooms" providing a context for the users virtual presence and "Objects" specifying content: an example of such an information structure is shown in FIG. 2.

Objects are the simplest data type. They are a general container for a variety of elements of the simplified connection environment provided. Initially they are used to represent applications, services, and content that are available either to a user and contained within a user structure, or available to any user within a room. An example of the first would be an address book application AB (as at 30) that the user would have chosen to use. This would always be available to the user whatever room they were in, but not generally available to other users. Objects within a room may be considered as having similarities to a shared white board within a video conferencing room or a bulletin board, with the users in that room all having that application made available to them.

Rooms may be understood as a metaphor for operational context which a user or object can be in, and may vary from a single bit data storage location to a fully rendered graphic representation of a three-dimensional virtual landscape navigable by the user. For example, each user will be assigned their own home room UHS 32. This represents both a personal and private space that they have some control over and a point of contact for them with the system and to them by applications and other users within the system. Services and applications will also be represented on the server by rooms. Each service 34 or application will generally be made up of a number of rooms 36, 38, 40, 42 in a hierarchical structure, though simpler applications may have only a single associated space. Association between content and/or services can be made through linking the rooms. Certain services will be able to use the room structure to provide additional support, for example for multi-user online chat or a shared white board.

Rooms can contain users and/or objects. So, for example, the personal organiser (Velo) help room 44 which is liable to be a HTML page when viewed on the screen of a personal organiser could have a number of users within it at any time. One of these "users" might be the system presence of a service representative who can then use a chat object (which represents a simple application) contained within that room to answer user queries. The help space would be one room in a larger help structure SUPPORT 46, and the server configured to be able to make intelligent guesses where in that structure the user is most likely to want to go, for example using client identifier and location information to place the user in the service centre for that make of device and for their country 48.

Users considered within the system are just a virtual embodiment 50 of the real user of the system. As such they contain the information that describes what applications to use, what their personal preferences UP 52 are, and information 54 identifying themselves, their location and the client they are using to access the system. A real user may have a number of alter egos 50, 56, 58, represented by different users on the system, for example to differentiate between home and work life While these will be separate users (insofar as the system is concerned), the relationship between them is also embodied so that common information can be shared: this is preferably extendable to allow such things as shared address books between husband and wife or boss and secretary.

When a user is activated its stored information 54 will contain a tag 54A representing the type of client device being used to access the system. If the real user is simultaneously on line via a number of client devices they will actually appear as a number of distinct users in the system. Depending on functionality and user choice, these multiple identities might be permitted to roam independently or to be linked together so that actions on one device are immediately reflected on to the others.

A new user is set up with a room 32 that represents their own space UHS on the system. Elements of this room can be considered by the user. This room provides a reference point for the user (and the servers view of the user) in the virtual space, although for simplicity in operation for the inexperienced user, it is preferably not even necessary early on for the user to know of its existence, with the user being able to log on as a new client of the server without first having to set up their room. This user space 32 may suitably have both private 32A and public 32B sections (which may be arranged as two distinct but interconnected rooms) allowing others to view some of the users space, whilst providing a secure space for the users most private data.

As described above, a room can contain one or more objects representing content. A splash page (or home page) for a simplified connection (SC) procedure to be described below may be an object 60 in the users private room 32A. Therefore, when first accessing the system, that content would be displayed. The user might want to attach their own home page HOME 62 to their public space 32B.

It is intended that the server structure be largely hidden from the user and indeed the service providers. To further illustrate the SC procedure, the following example is given.

A user, buying a device which has the SC capability enabled via a single button, does not need to be provided with items such as service provider home page address and registration protocols: instead, the user establishes any necessary physical connections and presses the button. A small software application on the device is run establishing an Internet link to the particular server 10 and bringing up a basic login screen requesting the users name and personal identification number (PIN). Because the user does not know what his PIN should be, he indicates this (and the fact that he is a new user) through a separate "initialise" button on the login screen or client controls and the server enters a registration procedure.

The input screen changes to allow the user to input his name, location, preferred language, etc. This information is sent to the server 10 which checks the details against its existing database (to make sure this person really has never signed up before) and responds by generating a unique PIN. This number is stored directly in a reserved location in the memory of the client device and is offered to the user—to be remembered for secure transactions and future purchases.

The server now downloads and offers a set of configuration options, and a choice of basic applications and services, for example an address book application, a chat tool and a share price monitor. Once selected, the necessary software changes, upgrades, and settings are downloaded and installed. In addition, factory defined applications and tools will also be installed. This should be the last time at the user needs to go through such a detailed set up process with any similarly configured Internet connected product. The selected applications are made available from the users simplified connection menu and, where the client operating system supports the feature, short cut icons are installed on their desktop.

If at any point the user wishes to access restricted information or make a secure transaction, he will need to enter his PIN. An option for this is made available at all times: once done, the user has total freedom to interact with all SC services requiring some degree of security clearance without having to repeatedly enter the code, and preferably without having to enter different codes for each application or service accessed via the server.

When the user next purchases a product having the SC feature, the procedure is suitably again initiated as a one button press operation. On pressing the button, the user is presented with the login screen with which he is familiar from the previous product. He now types in his name and PIN and the server goes into action, setting the system up in his favoured language, with the clock set to the standard correct time zone for that user and presenting details from a favoured application, such as offering a simple share price display.

By use of the alter-ego option (support for multiple users 50, 56, 58), options preferred for work, such as the regular updates on share prices, may be dispensed with and/or replaced by different preferences during the users leisure hours.

Figure 3:
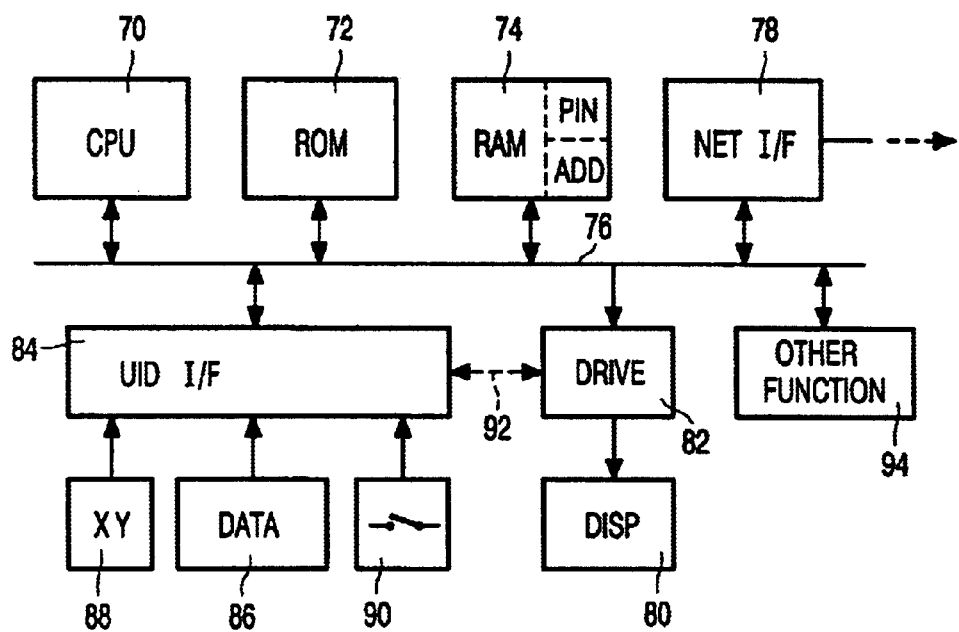
FIG. 3 represents functional features of a client device embodying a first aspect of the invention.

Typical functional features of a client device as configured for use with the generic (bidirectional translating) server 10 described above are illustrated in FIG. 3. Basically, these comprise a central processing unit CPU 70, read only memory ROM 72, random access memory RAM 74, all coupled via an address and data bus 76.

Also coupled to the bus is a network interface stage 78, with the random access memory RAM 74 holding the users PIN and network address ADD for the host server, and ROM 72 holding the local end of the SC application including, for example, capabilities for downloading of software from the server 10. As will be appreciated, the network interface 78 may take a number of forms depending on the form of the client device and the users means for connection to the server: for example, where the client is a PC, the network interface may comprise a built-in modem or ISDN link, whereas if the client is a pager or telephone, the network interface will include a (preferably) cordless connection to a local link to the server. A display device 80 is also coupled to the bus, via display driver 82 circuit. Again, the particular form of display will be to a certain extent determined by the client device with the PC possibly having a cathode ray screen and other client devices using liquid crystal display.

A user input device interface 84 handles input whatever form of control means are provided by the client. These will typically include a data input 86, for an alphanumeric keyboard in a personal computer or personal digital assistant keyboard, keypad for a telephone, or control buttons for a pager; also typically input for some client types will be a positional signal 88 from an XY pointer device such a as a mouse or joystick or input as part of touch screen mapping. For all client types, there is also a single input 90 for the simplified connection (SC) routing. These inputs 86, 88, 90 may be physical keys, switches or buttons or, as indicated by dashed line 92, some or all of these may be selectable icons or buttons appearing on display 80 with operation through cursor selection or by means of touch screen technology. Whatever the client type, it is important that this single button be easily identifiable by the user, regardless of whether it is a physical or virtual entity (i.e. whether it is a relatively large and brightly coloured push button protruding through the casing of the client device, or whether it is a generated and displayed icon).

As shown at 94, other device functions are also coupled to the address and data bus 76: these other functions will be specific to the operation of the client device but will not have (necessarily) any effect on its interaction with the server, and will not be further described.

Figure 4:
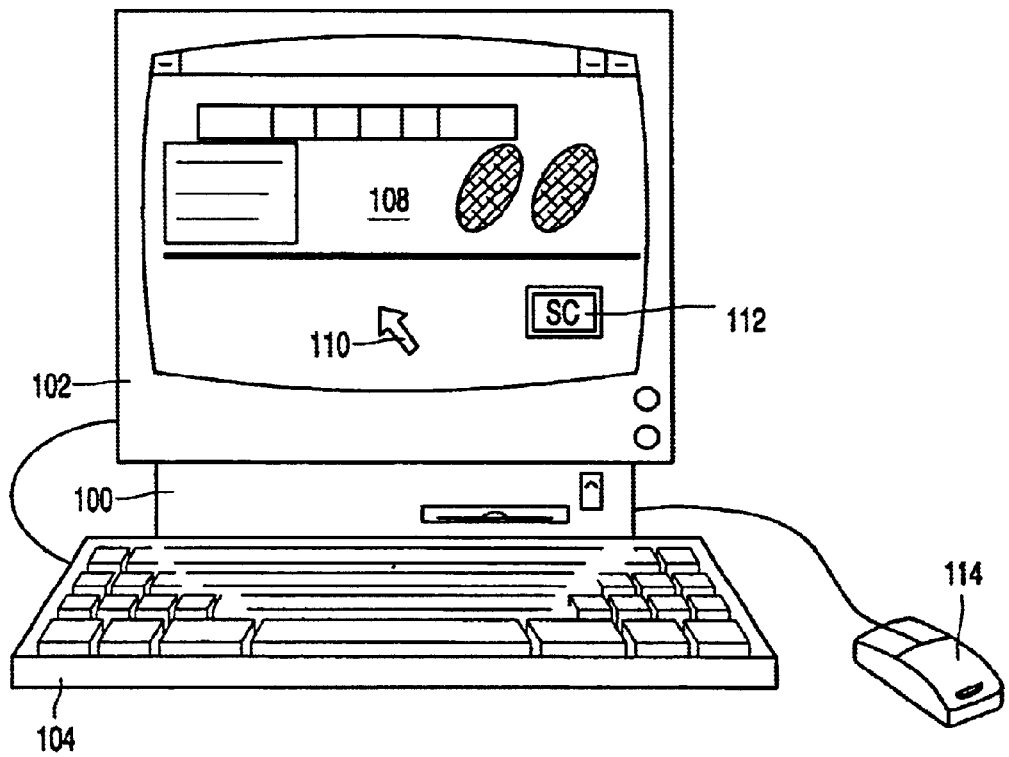
FIGS. 4 to 6 represent the client device of FIG. 3 embodied as respectively a personal computer, an electronic personal organiser, and a pager.

FIG. 4 shows an example client device in the form of a personal computer 100 with monitor screen 102 and keyboard 104. As shown on the screen, a standard interface 108 to the server is presented, having been accessed as a result of cursor 110 selection of a screen icon 112 for the one-touch SC operation. Control of the cursor 110 is by means of a an XY pointer device, in this case a mouse 114.

Figure 5:
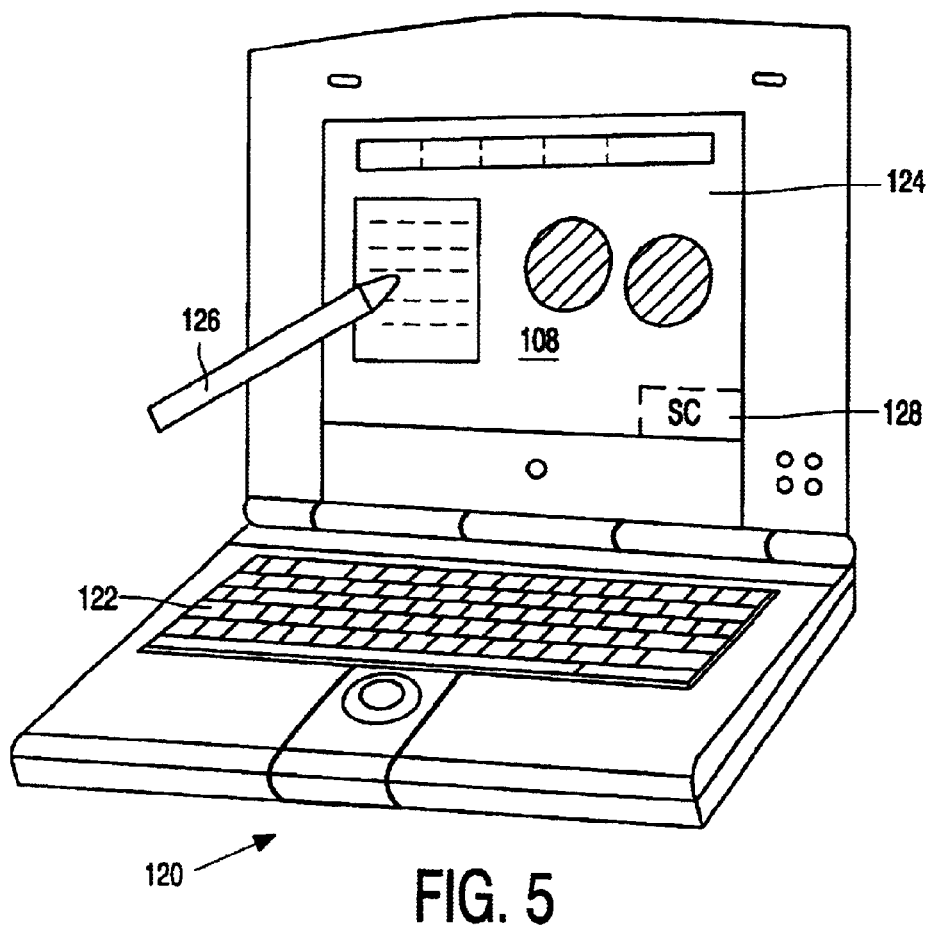

An alternate form of client device, this time a personal digital assistant (PDA), is shown in FIG. 5. The PDA 120 includes a keyboard 122 and LCD display screen 124 with user selection from the screen being accomplished either through manipulation of keyboard 122 keys, or by selection direct from the screen by a pointer 126, in known manner. As with the PC embodiment of FIG. 4, the common interface 108 is presented to the user and, in this embodiment, the one button SC actuator is again in the form of a screen icon 128.

Figure 6:
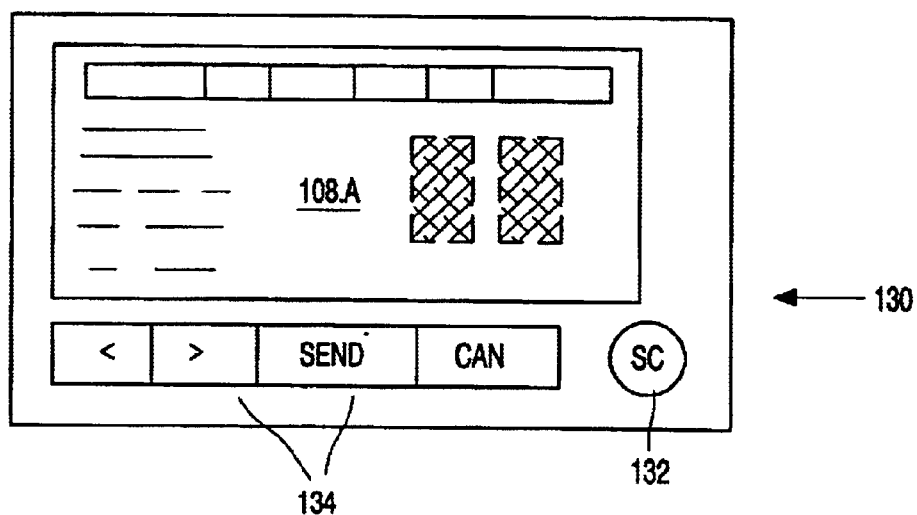

A further alternate form of client device is a pager 130 as shown in FIG. 6. Here, the standard interface 108A is slightly modified to allow for the reduced resolution and smaller size of the pager display, but otherwise the majority of the basic search tools with which the user has become familiar will be supported. Unlike the embodiments of FIGS. 4 and 5, the SC actuator 132 in this example is a physical push-button control located on the front panel of the pager device adjacent the pagers other controls 134.

Figure 7:
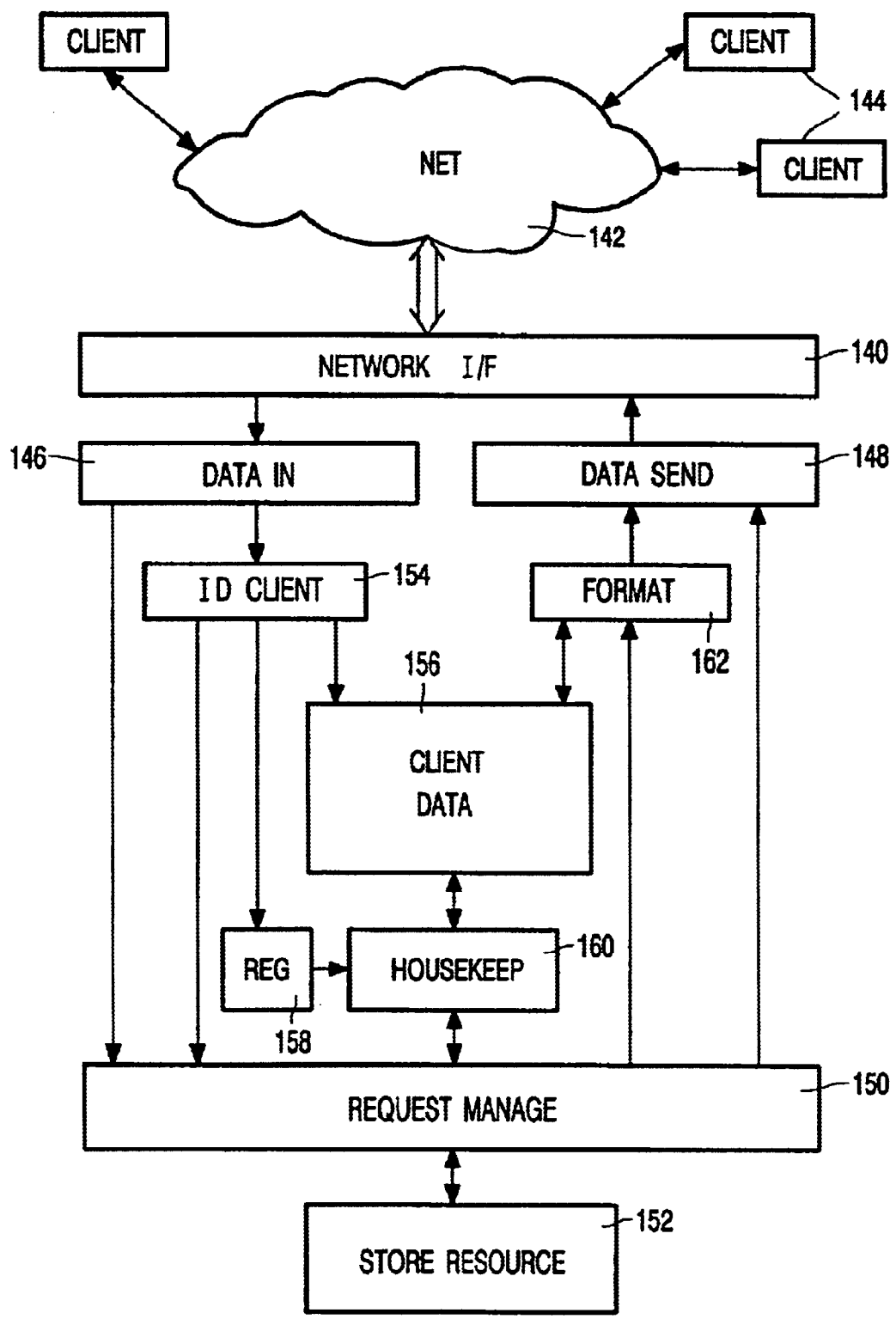
FIG. 7 schematically represents functional features of a network server embodying further aspects of the present invention.

The functional features that go to make up the server 10 of FIGS. 1 and 2 are generally illustrated in FIG. 7. An interface 140 links the server to the data network 142 to which the clients 144 are periodically connected. The interface handles both receipt of messages for data-input stage 146, and sending of messages for output stage 148. Both the data in 146 and data out 148 stages communicate directly with, and are controlled by, a main processor 150 handling request management, by reference to a connected store 152 of operational data.

The received data at the data in stage 146 is separated into that originating from clients (which is passed to client identification stage 154) and that from other sites, perhaps in response to a request dispatched by data send stage 148: this latter data is passed direct to the message manager 150. The client identification stage 154 compares received client data with a stored database 156 in determining whether they are an existing client and, if not, the registration procedure described previously is triggered by registration handler stage 158. Checks on registration form part of the general system housekeeping function 160 which may periodically sweep the client database 156 to remove data of clients from whom no contact has been received for a predetermined period (suitably a fairly long lay-off of up to 2 years is allowable).

Having handled the client requests, the message manager 150 collates the data for the response from the applications or services that the user has accessed and passes it to formatting stage 162 which puts it into the particular format for that user by reference to both stored user preferences and an indication of the current client capabilities, as held in the database 156.

From reading the present disclosure, other modifications will be apparent to persons skilled in the art. Such modifications whilst remaining within the scope of the following claims, may involve other features which are already known in the design, manufacture and use of data transmission and presentation systems, display apparatuses and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same the technical problems as does the present invention. The applicants hereby give notice that new claims may be formulated to such features and/or combinations of features during the prosecution of the present application or of any further application derived therefrom.

What is claimed is:

1. A network communication system comprising:

a plurality of configurations of user stations, each station comprising respective processing and display means, and a plurality of service provider host systems coupled via a data network, wherein at least some of the user stations are registered as client stations with a first service provider host system, said first host system including storage means maintaining a database of registered client station user identification data, so that each client station of a single user is arranged to access content from said plurality of service provider host systems via said first host system without repeating a full registration process to each of said plurality of service provider host systems, and said first host system is arranged to format data to be sent to any client station of said single user according to a pre-stored format for that user; and wherein said single user has a simplified connection (SC) means to initially perform the registration process of a client station and to update any information subsequent to registration.

2. A network communications system as claimed in claim 1, wherein on registration of a new user, the host system is arranged to generate a digital password, transmit the said password to the client station currently used by the user via the data network, and store the said password with details of the new user within the said database.

3. A network communications system as claimed in claim 2, wherein on registration of a new client station for an existing registered user, the first host system is configured to link the existing stored user details to the new client details on receiving the password from the user via the new client station.

4. A network communications system as claimed in claim 1, wherein each client station is arranged to identify one or more of its functional capabilities to the first host system, and said first host system is arranged to modify the formatting of data sent to said client where said functional capabilities preclude use of said pre-stored format.

5. A network communication system as claimed in claim 4, wherein said functional capabilities include supported image resolution for a display device of said user station, and said first host system is arranged to set the resolution of display data sent to said user station accordingly.

6. A network communication system as claimed in claim 1, wherein said first host system storage means holds a plurality of data assets for said single user, which assets are made available to each client station of said user.

7. A network communication system as claimed in claim 6, wherein said first host system storage means is operable, on receipt of a predetermined command from said single user, to make available one or more of said data assets to a further user identified by said single user.

8. A data network browser configured as a user station for use in the network communications system of claim 1, said browser comprising a data processor coupled with a network interface and an output for driving a display, the browser further comprising an actuator coupled with a store holding the network address of said first host system and being configured, on user operation of said actuator, to establish connection to said first host system via said network.

9. A network server for use as said first service provider host system in a network communications system as claimed in claim 1, the server comprising a first storage means maintaining a database of registered user and user client station identification data, and means to identify messages from a particular user, to recall from store a specified message format for that user, and to convert, prior to transmission, all messages to that user to the specified format.

* * * * *